United States Patent
Fu et al.

(10) Patent No.: US 7,793,103 B2
(45) Date of Patent: Sep. 7, 2010

(54) AD-HOC NETWORK KEY MANAGEMENT

(75) Inventors: Zhi Fu, Lake Zurich, IL (US); Donald E. Eastlake, III, Milford, MA (US); Anthony R. Metke, Naperville, IL (US)

(73) Assignee: Motorola, Inc., Schaumburg, IL (US)

( * ) Notice: Subject to any disclaimer, the term of this patent is extended or adjusted under 35 U.S.C. 154(b) by 234 days.

(21) Appl. No.: 11/464,744

(22) Filed: Aug. 15, 2006

(65) Prior Publication Data
US 2008/0046732 A1 Feb. 21, 2008

(51) Int. Cl.
H04L 9/32 (2006.01)
(52) U.S. Cl. ............... 713/171; 713/168; 713/150; 380/47; 380/229; 705/67; 709/225; 709/226; 709/229
(58) Field of Classification Search ................ 713/171, 713/168, 150; 380/47, 229; 705/67; 70/225, 70/226, 229
See application file for complete search history.

(56) References Cited

U.S. PATENT DOCUMENTS

| | | | | |
|---|---|---|---|---|
| 5,675,649 A | * | 10/1997 | Brennan et al. | 380/286 |
| 5,761,311 A | * | 6/1998 | Spelman et al. | 380/30 |
| 2004/0103282 A1 | * | 5/2004 | Meier et al. | 713/171 |
| 2005/0223111 A1 | * | 10/2005 | Bhandaru et al. | 709/236 |
| 2005/0254653 A1 | * | 11/2005 | Potashnik et al. | 380/270 |
| 2006/0126847 A1 | * | 6/2006 | Ho | 380/277 |

FOREIGN PATENT DOCUMENTS

EP  1516461 A2  8/2006

OTHER PUBLICATIONS

Jiejun Kong, Petros Zerfos, Haiyun Luo, Songwu Lu and Lixia Zhang—"Providing Robust and Ubiquitous Security Support for Mobile Ad-Hoc Networks"—IEEE 9th International Conference on Network Protocols (ICNP'01), 2001.
Wenliang Du, Jing Deng, Yunghsiang S. Han, Shigang Chen and Pramod Varshney—"A Key Management Scheme for Wireless Sensor Networks Using Deployment Knowledge"—IEEE INFOCOM'04, Mar. 7-11, 2004, Hong Kong.

(Continued)

*Primary Examiner*—Edan Orgad
*Assistant Examiner*—Roderick Tolentino
(74) *Attorney, Agent, or Firm*—Randi L. Karpinia

(57) ABSTRACT

An ad hoc network includes a first node, a second node, and a third node. The first node and second node share a first shared secret key, and the first node and third node share a second shared secret key. The second node and third node share a temporal key. The first node generates a unique key, encrypts the unique key with a first shared secret key to generate a first encrypted unique key and transmits the first encrypted unique key to the second node. The first node encrypts the unique key with a second shared secret key to generate a second encrypted unique key and transmits the second encrypted unique key to the third node. To establish the temporal key, the second node decrypts the first encrypted unique key and the third node decrypts the second encrypted unique key thereby each generating the unique key.

13 Claims, 6 Drawing Sheets

OTHER PUBLICATIONS

Haowen Chan, Adrian Perrig, Dawn Song- "Random Key Predistribution Schemes for Sensor Networks"—2003 IEEE Symposium on Research in Security and Privacy.

Srdjan Capkun, Jean-Pierre Hubaux, Levente Buttyan- "Mobility Helps Security in Ad Hoc Networks—" The Fourth ACM International Symposium on Mobile Ad Hoc Networking and Computing Annapolis, Maryland, USA Jun. 1-3, 2003.

N. Asokan, Philip Ginzboorg—"Key Agreement in Ad Hoc Networks"—Computer Communications, 23:1627-1637, 2000 (another version).

IEEE, "Principles of Port Access Control Operation," 802.11X; Local and metropolitan ares networks—Port-Based Network Access Control, Section 6, Dec. 2004, pp. 11-22.

IEEE, "Sample IBSS 4-Way Handshakes," 802.11;Local and Metropolitan Area Networks—Part 11; Amendment 6: Medium Access Control (MAC) Security Enhancements, Section 5.9.3.2, Jul. 2004, pp. 17-19.

PCT/US07/75428 - PCT Search Report and Written Opinion - Mailed Jun. 20, 2008 - 6 pages.

* cited by examiner

AD-HOC NETWORK KEY MANAGEMENT

FIELD OF THE INVENTION

The present invention relates generally to communications, and more particularly to ad hoc networks and techniques for establishing shared secret keys between two nodes in an ad hoc network.

BACKGROUND

Mobile nodes such as cellular phones, personal digital assistants (PDAs) and notebook computers often require authentication when accessing remote databases or networks.

In prior systems, a centralized authentication procedure is followed where a single Infrastructure Access Point (IAP), such as a base station, handles an authentication process for all nodes within range of the IAP. For instance, systems which adhere to American National Standards Institute/Institute of Electrical and Electronics Engineers (ANSI/IEEE) 802.1X or ANSI/IEEE 802.11i standards utilize such a centralized procedure to control access to network resources.

IEEE 802.1X is an IEEE standard initially designed to provide authentication, access control, and key management in both wired and wireless networks. Three entities defined in 802.1X are a Supplicant, an Authenticator and an Authentication Server (AS). The Supplicant is the node seeking authentication and access authorization. The Authenticator or Network Access Server (NAS) is the node with which the Supplicant communicates directly. The AS, sometimes referred to as the Authentication, Authorization and Accounting (AAA) Server, authenticates and grants access, if authorized, to a Supplicant based on the Supplicant's credentials. An AS can be co-located with an Authenticator. Authentication is conducted between the Supplicant and the Authentication Server while the Authenticator acts as a pass-through of the authentication messages. The Authenticator has an uncontrolled port and a controlled port for every client. Before a client is authenticated, only authentication messages are allowed to pass through the uncontrolled port. Only after the Supplicant is successfully authenticated can other traffic be passed via the controlled port.

A protocol used for these communications between the Supplicant and the Authentication Server is EAP (Extensible Authentication Protocol). For 802.1X, EAP messages between the Supplicant and the Authenticator are encapsulated in EAPOL (EAP over local area network (LAN)) message formats. EAP is flexible and extensible in supporting multiple authentication mechanisms such as user password, certificate based authentication, one time password, authentication token or smart card, and the like. It provides a vehicle to negotiate and use appropriate authentication mechanisms including those which derive keying material at the Supplicant and the AS.

An authentication procedure can begin when a node transmits an authentication request using, for example, an Extensible Authentication Protocol (EAP) comprising EAP Over Local Area Network (EAPOL) packets. The authentication process involves several EAPOL packets being transmitted and received, beginning with an EAP start packet and finishing with either an EAP success message packet or an EAP failure message packet. The authentication server stores the authentication credentials of a mobile device (typically called a Supplicant) that is being authenticated. Authentication servers also can be connected to other authentication servers to obtain Supplicant authentication credentials that are not stored locally.

As described in the "IEEE Standard for Local and metropolitan area networks—Port-Based Network Access Control", IEEE 802.1X-2001, June 2001, Supplicants (or nodes seeking to authenticate and gain access) are assumed to be one hop from the Authenticator (e.g., an intelligent access point (IAP)) which grants or refuses access. Traditional 802.1X does not contemplate multi-hop communication between the Supplicant and the Authenticator. Because every Supplicant can be authenticated only via an IAP, such a centralized procedure might not be practical in ad hoc wireless communication networks that have nodes outside of the wireless communication range of an IAP.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
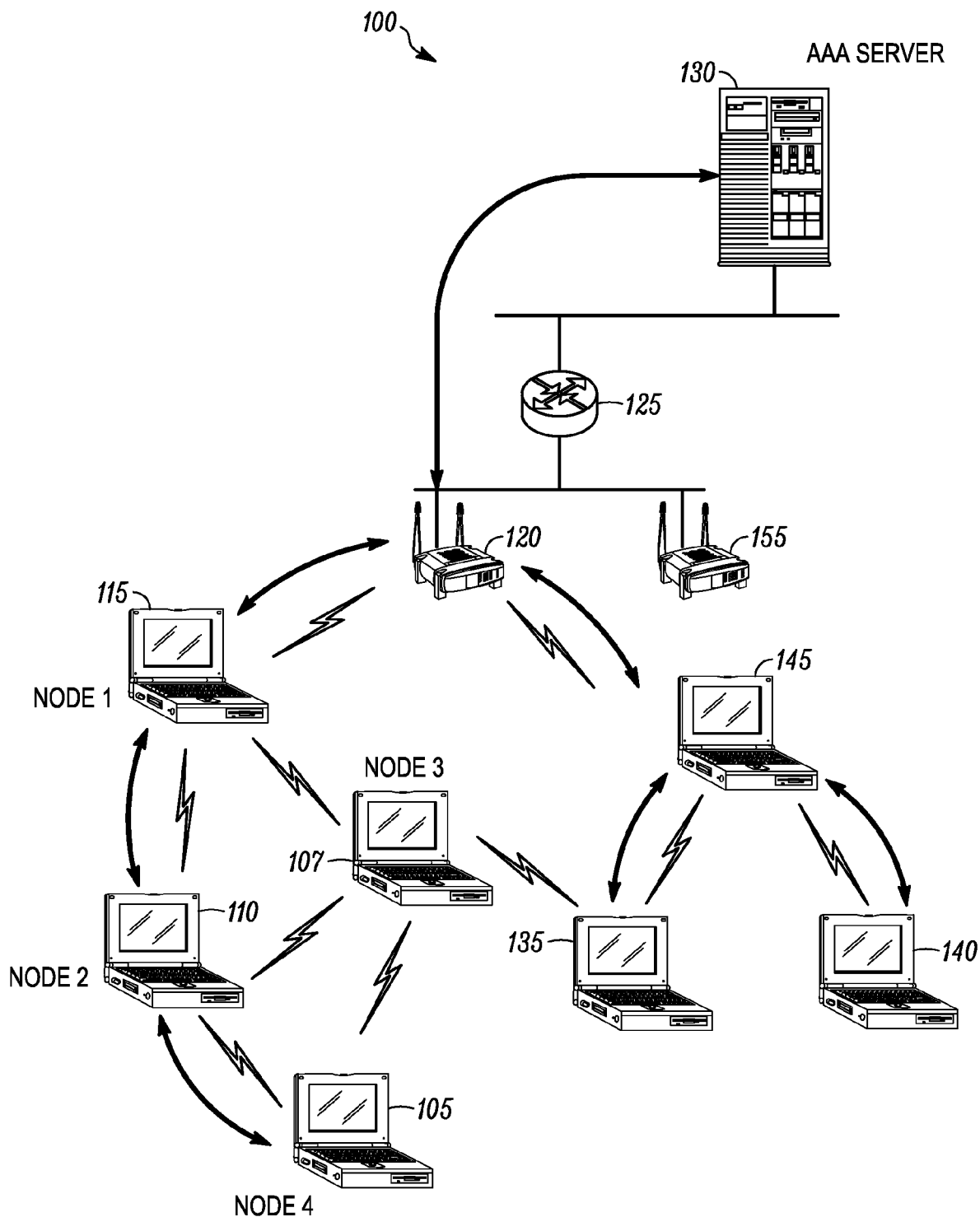
FIG. 1 is a simplified representation of an exemplary ad hoc network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail various embodiments that are in accordance with the present invention, it should be observed that the embodiments reside primarily in combinations of method steps and apparatus components related to establishing unique shared secrets for data and routing protection between pairs of neighboring nodes (or every pair of neighbor nodes) without implicating network infrastructure. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as first and second and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions for establishing unique shared secrets between a pair of neighboring nodes as described herein. The non-processor circuits may include, but are not limited to, a radio receiver, a radio transmitter, signal drivers, clock circuits, power source circuits, and user input devices. As such, these functions may be interpreted as steps of a method for establishing unique shared secrets between pairs of neighboring nodes for data and routing protection. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

802.1X Relay Authentication Protocol

In the 802.1X relay multi-hop authentication framework, techniques are provided for pair-wise master key (PMK) sharing along the path from a mobile node or Supplicant (that is multiple hops from the IAP) when the mobile node or Supplicant requests authentication to the IAP. According to this approach, the PMK is shared by at least three parties: the AAA server, the Supplicant and the Authenticator. In scenarios where intermediate nodes are present between the IAP and the two nodes which will use the PMK to establish a temporal key, each intermediate node will have access to the PMK (e.g., the two nodes which will use the PMK to establish a temporal key are not the only nodes who potentially know the PMK).

FIG. 1 is a simplified representation of an exemplary ad hoc network 100. The ad hoc network 100 comprises a plurality of nodes 105, 110, 115, 135, 140, 145, one or more intelligent access points (IAPs) 120, 155, a router 125, and an AAA server 130. The infrastructure portion of the network includes the IAPs 120, 155 which are coupled to the AAA server 130 via the router 125. In this exemplary network configuration, Node1 115 and Node 145 are one hop from the IAP 120, Node2 110, Node3 107, Node 135 and Node 145 are two hops from the IAP 120, and node 105 is three hops from the IAP 120.

As described above, each node in the network establishes a trust relationship with the AAA Server 130 deployment. This can be based on, for example, a password, a SIM (subscriber identity module) card identification (I.D.) or other I.D. which is unique to the particular node and is stored at the AAA Server 130. Each node uses this relationship with the AAA Server 130 to authenticate to that AAA Server 130. The AAA Server 130 (or the IAP 125) also helps the particular node that is authenticating to establish a trust relationship with its neighbor nodes by distributing a shared secret that is encrypted and that can only be decrypted by that particular node and its immediate neighbor through which it hopped through to authenticate.

For example, the nodes 105, 105, 110, 115, 135, 140, 145 can each independently establish a "shared master key (SMK)" by authenticating with the AAA server 130. Each of the particular nodes shares its SMK only with the IAP 120. For example, in one exemplary implementation, Node1 115 transmits a first authentication request to the AAA server 130 via the IAP 120. The AAA server 130 authenticates Node1 115, and Node1 115 and AAA server 130 simultaneously derive a first shared master key (SMK) that will be shared between Node1 115 and the IAP 120. Although not shown, it will be appreciated that this authentication process can also happen between the AAA server 130 and each of the other nodes 145, 110, 107, 135, 140, 105. The AAA server 130 securely transmits the SMKs to the IAP 120 which then transmits the shared master keys (SMKs) (also referred to as a "pair-wise" master key (PMK)) only to the nodes for which they are intended. Thus, at this point, the nodes have authenticated to the AAA server 130 via the IAP 120 and established SMKs. As will be described below, the SMKs can then be used to derive more shared secrets (or "temporal keys") for data or routing protection.

During 802.1X relay authentication, the IAP 120 also provides a first shared secret key (SSK), for example, to Node4 105 and Node2 110. The first SSK is shared only by Node2 110 and Node4 105. Node4 105 and Node2 110 will use the first SSK to derive more keys then use the keys to encrypt or authenticate communication between Node4 105 and Node2 110 to ensure security of future communications between them. For example, in one exemplary implementation, the IAP 120 randomly selects a first shared secret key for Node2 110 and Node4 105 to share. The IAP 120 encrypts the first shared secret key using the second SMK of Node2 110 to generate a first encrypted shared secret key (ESSK), and encrypts the first shared secret key using the third SMK of Node4 105 to generate a second ESSK. In other words, the first shared secret key will be separately encrypted by Node2's SMK/PMK and by Node4's SMK/PMK so only Node4 105 and Node2 110 can decrypt the first shared secret key. The IAP 120 transmits a response packet to Node2 110 and Node4 105. The response packet comprises the first ESSK and the second ESSK. Upon receiving the first ESSK, Node2 110 decrypts the first ESSK using the second SMK to generate the first SSK. Similarly, Node4 105 decrypts the second ESSK using the third SMK to generate the first SSK.

The first SSK can then be used during an IEEE 802.11i four-way handshake process to establish/derive more shared secrets (SS) to protect information transmitted between Node2 110 and Node4 105. It is a common security practice to use multiple security keys to protect multiple sessions to minimize the damage caused by a compromised key.

Other nodes can use a similar process to establish SSKs between pairs of nodes to protect information transmitted between those pairs of nodes.

It will be appreciated by those of ordinary skill in the art that there is a significant roundtrip delay associated with hopping through each node to reach the IAP 120 and/or the AAA Server 130 to authenticate, and establish shared secrets between each pair of nodes. As trust relationships are established between pairs of nodes, it becomes inefficient as the number of nodes in an ad hoc network increases to always have the to implicate the AAA Server 130 to establish trust relationships with a particular node. For example, in FIG. 1, once Node4 105 has established a trust relationship with Node2 110, and further Node3 107 has also established a trust relationship with Node2 110, it is inefficient to have Node4 105 and Node3 107 communicate all the way through the ad hoc network to the AAA Server 130 to establish a trust relationship or shared secret between Node4 105 and Node3 107.

It would be desirable to eliminate the need to have to authenticate with the AAA Server 130 each time a particular node seeks to establish a trust relationship with another neighbored node.

As a general cryptographic principle, it is not desirable to share a key among any more parties than those directly securing their communications with that key (e.g., two parties for pair-wise communications or the group for multicast/broadcast). For instance, according to the "IEEE Standard for Local and metropolitan area networks—Part 11: Wireless Medium Access Control (MAC) and Physical Layer (PHY) specifications: Amendment 6: Medium Access Control (MAC) Security Enhancements", IEEE 802.11i, June 2004, the PMK is never used directly in 802.11i for pair-wise communications; rather a different pair-wise key is negotiated.

Overview

Scalable, efficient, shared-secret based, key management techniques are provided for a multi-hop authentication framework. The disclosed embodiments relate to techniques for establishing a unique shared secret shared only between a pair of mobile nodes in an ad hoc network without implicating network infrastructure to establish the shared secret. These techniques leverage trust relationships between neighbor nodes to establish trust between other nodes which have yet to establish a trust relationship or shared secret. These techniques provided a secure way for neighbor nodes to establish a trust relationship or shared secret without having to authenticate to the AAA Server 130. This can help reduce bottlenecks in the ad hoc network by eliminating a need for every node in an ad hoc network to authenticate by hopping through any nodes between that node and the Access Point 120 and then authenticating to the AAA Server 130.

According to one exemplary implementation, a first shared secret (between a first node and a second node) and a second shared secret (between the first node and a third node) are used to establish a third shared secret between the second node and the third node without implicating network infrastructure (e.g., IAP or AAA server). The 802.1X authentication model can be modified and extended for efficient and lightweight key management. The 802.1X relay model can be modified and extended in order to establish a shared secret between neighboring nodes for data and routing protection. A common trusted node can be used to establish shared secrets between neighbors. Using these techniques, each node can establish a unique shared secret with each of its neighboring nodes. With protected routing, they can create the shortest routes among themselves without going through an IAP. According to these techniques, any node only shares a secret with a neighboring ad-hoc node. Each node then shares a different secret with the IAP and each of its neighboring nodes.

For example, in an ad hoc network including a first node, a second node, a third node, and an authentication server, techniques are provided for establishing a temporal key shared by the second node and the third node. The first node can be implemented at any node in the ad hoc network and the authentication server can be implemented at any node in the ad hoc network. In one implementation, the first node may comprise an IAP, and the authentication server (e.g., AAA server) is coupled to the IAP.

The authentication server and the second node derive a first shared secret key (SSK) via an authentication protocol between the authentication server and the second node. The first node and the second node share the first SSK. The authentication server and the third node derive a second SSK via an authentication protocol between the authentication server and the third node. The first node and the third node share the second SSK.

The first node can generate a unique key. In one embodiment, the unique key comprises a pair-wise master key, and the second node and the third node use the pair-wise master key during a shared-secret-based mutual authentication protocol, such as an IEEE 802.11i four-way handshake, between the second node and the third node to derive the temporal key shared only by the second node and the third node. The unique key can be retained on the second node and the third node. The second node and the third node can regularly re-establish the temporal key after a period elapses since the most recent communication between the second node and the third node. In one implementation, the first node may comprise, for example, a pseudo-random number generator configured to randomly generate the unique key. In one implementation, the first node may comprise, for example, a hash function which calculates the unique key by hashing at least one input with the first shared secret key or with the second shared secret key. In yet another implementation, the hash function can calculate the unique key by hashing the first shared secret key and the second shared secret key.

The first node encrypts the unique key with first SSK to generate a first encrypted unique key and transmits the first encrypted unique key to the second node. The first node encrypts the unique key with second SSK to generate a second encrypted unique key and transmits the second encrypted unique key to the third node. The second node decrypts the first encrypted unique key using the first SSK to generate the unique key, and the third node decrypts the second encrypted unique key using the second SSK to generate the unique key. The second node and the third node can then use the unique key (e.g., PMK) to establish a temporal key, shared only by the second node and the third node, to encrypt or protect data communications between the second node and the third node. Significantly, other intermediate nodes along the path between the first node and the second/third nodes have no way of determining the unique key since they do not have the first SSK or the second SSK needed to decrypt the unique key.

Before describing these techniques, techniques will first be described for establishing a SSKs between nodes in an ad hoc network and an AP in the ad hoc network. The SSKs will eventually be used, as described with reference to FIGS. 2 and 5, to establish temporal keys for use by the nodes in the ad hoc network when protecting data communications between a particular pair of nodes in the ad hoc network.

Figure 2:
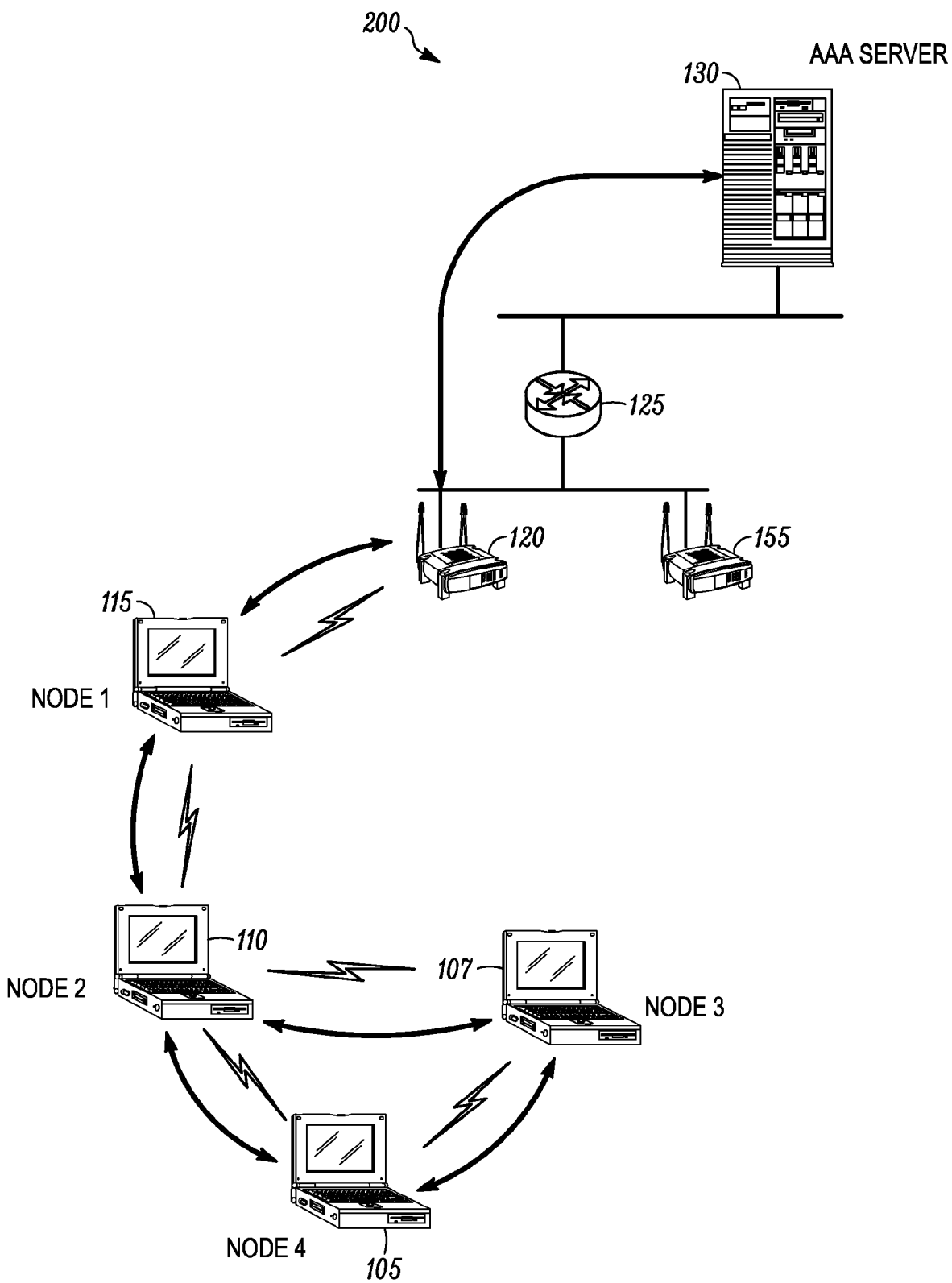
FIG. 2 is a simplified representation of the exemplary ad hoc network of FIG. 1 at a later time when Node3 attempts to establish a trust relationship with Node4.

FIG. 2 is a simplified representation of the exemplary ad hoc network when Node3 107 attempts to establish a trust relationship with Node4 105 so that those nodes can communicate securely with each other. The exemplary ad hoc network 100 comprises Node1 115, Node2 110, Node3 107, Node4 105, one or more access points (APs) 120, 155, a router 125, and an AAA server 130. The infrastructure portion of the network includes the IAPs 120, 155 which are coupled to the AAA server 130 via the router 125. In this exemplary network configuration, Node1 115 is one hop from the IAP 120, Node2 110 is two hops from the IAP 120, and Node4 105 and Node3 107 are three hops from the IAP 120.

As discussed above, the nodes 105, 107, 110, 115 can each independently establish a "shared master key (SMK)" by authenticating with the AAA server 130 that each of the particular nodes shares only with the IAP 120. The AAA server 130 securely transmits the SMKs to the IAP 120 which then transmits the shared master keys (SMKs) only to the nodes for which they are intended. Thus, at this point, the nodes have authenticated to the AAA server 130 via the IAP 120 and established SMKs. As will be described below, the SMKs can then be used to derive more shared secrets (or "temporal keys") for data or routing protection when communicating with the IAP 120.

In the following example techniques are described which can allow another node, such as Node3 107, to establish a shared secret, for example, with Node4 105 without contacting the AAA Server 130. For example, if Node4 105 seeks to establish trust with Node3 107, the trust relationship between Node2 110 and Node4 105, and the trust relationship between Node2 110 and Node3 107, can be leveraged to establish trust relationships between Node4 105 and Node3 107. In other words, when Node4 105 and Node3 107 need to establish a shared secret, if it is assumed that both Node4 105 and Node3 107 have each independently established a shared secret and hence trust relationship with Node2 1 10, then, as will be described below, Node4 105 can ask or request that Node2 110 provide information that can be used by Node4 105 to establish a shared secret with Node3 107. Upon authentication of Node4 105, Node2 110 will randomly generate a unique key which it can securely distribute to Node3 107 and Node4 105. These techniques allow the roundtrip delay associated with contacting the AAA Server 130 to be eliminated and also reduce the number of entities which are exposed to a secret that is shared only between a pair of nodes. These techniques for establishing a shared secret between two nodes, without implicating network infrastructure to establish the shared secret, will now be described with reference to FIG. 3.

Figure 3:
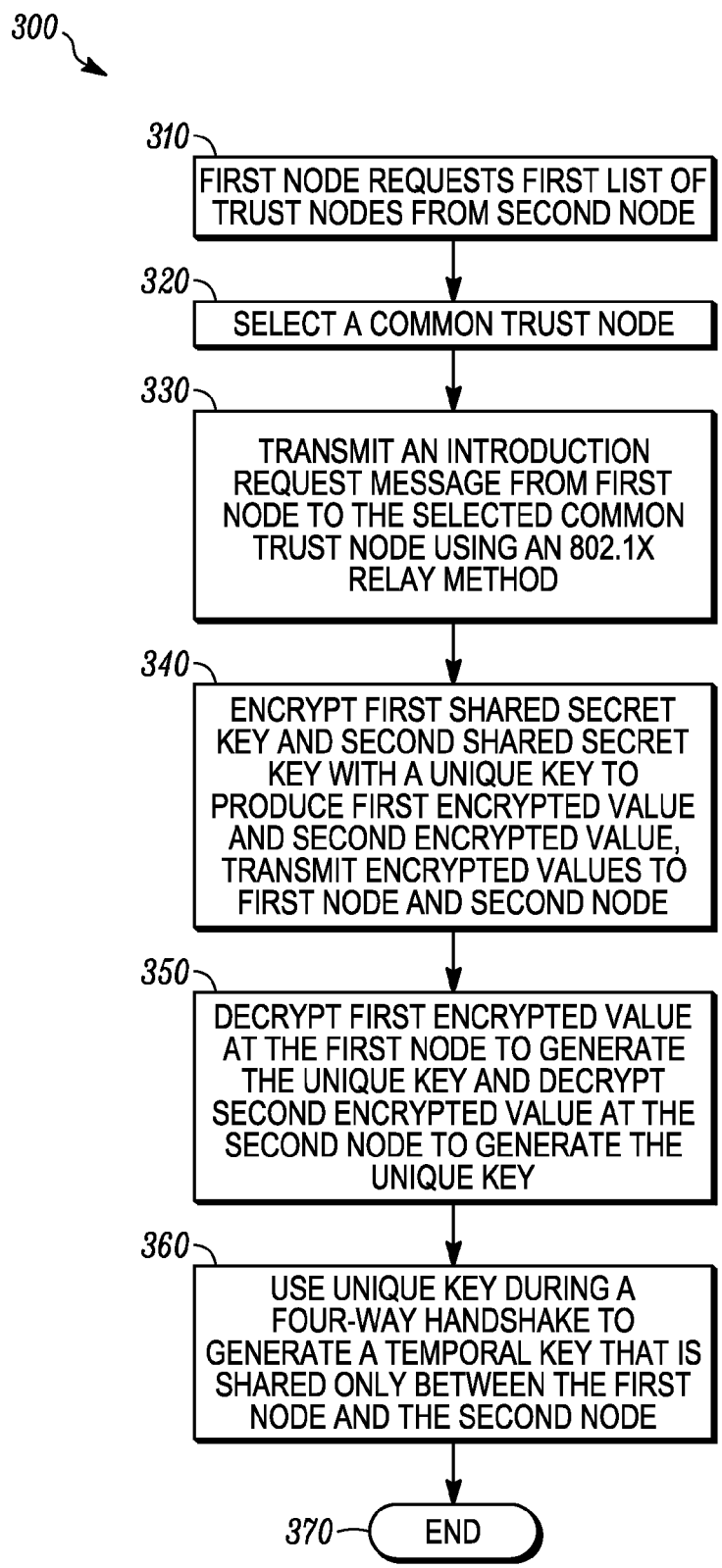
FIG. 3 is a flowchart showing techniques for establishing a shared secret between a pair of nodes according to one exemplary implementation.

FIG. 3 is a flowchart 300 showing techniques for establishing a temporal key between a pair of nodes according to one exemplary implementation. Although the techniques of FIG. 3 will be described with reference to the ad hoc network 200 of FIG. 2, it will be appreciated that these techniques can also be applied to any other ad hoc network configuration. Moreover, in the following description, the use of these techniques will be described with respect to a single pair of nodes, however, it should be appreciated that these techniques can be used to establish a temporal key between multiple pairs or every pair of neighbor nodes in an ad hoc network. According to one exemplary implementation of these techniques, a first shared secret key (e.g., between a Node4 105 and Node2 110) and a second shared secret key (e.g., between Node2 110 and Node3 107) are used to establish a temporal key between Node4 105 and Node3 107 without implicating infrastructure (e.g., IAP or AAA server). Thus, these key management techniques can leverage the 802.1X authentication model for trust and shared secret establishment among neighboring nodes, which is efficient, automatic, dynamic, and flexible.

In this example, Node2 110 and Node3 107 share a first shared secret key (SSK) that is not shared with other nodes, and Node2 110 and Node4 105 share a second shared secret key (SSK) that is not shared with other nodes. The first SSK and the second SSK can be established using the techniques known to those skilled in the art (e.g., EAP). As will be described in detail below, the first SSK and the second SSK can be used to establish a temporal key that is shared only by Node3 107 and Node4 105.

To establish trust between Node4 105 and Node3 107, according to one exemplary implementation of these techniques, Node4 105 requests a first list of trusted nodes from Node3 107 at step 3 10. In one implementation, Node4 105 could also exchange a list of trust nodes with Node3 107 when it transmits this request. Each pair of nodes in the network 200 share at least one common trust node, for example, the IAP 120, 135 or the AAA server 130 or other common trust node(s), such as Node2 110 in this particular scenario.

At step 320, Node4 105 determines which trust nodes it has in common with Node3 107. This determination can be accomplished, for example, by comparing the first list of trusted nodes to a list of trust nodes trusted by Node4 105. In one implementation, Node4 105 can select a common trust node that is the closest in terms of number of hops or is the shortest path away from Node4 105. Alternatively, the node having the lowest MAC address could be used. Node3 107 could also perform a similar determination selection step. It should be appreciated that depending on the network configuration there could be multiple trust nodes in common between Node4 105 and Node3 107. In the event there are multiple common trust nodes, then one of them can be selected as the introduction node based on criteria such as shortest distance or lowest MAC address, etc.

In this example, Node4 105 determines Node2 110 is trusted by both Node4 105 and Node3 107 and selects Node2 110 as the common trust node.

At step 330, Node4 105 transmits an introduction request message to Node2 110. The introduction request message can include, among other information, authentication data for Node4 105 including the second SSK, and can be transmitted using an 802.1X relay method. Alternatively, the authentication data can be transmitted separately apart from the introduction request message or in response to a positive response message granting the request in the introduction request message.

Common trust Node2 110 generates unique key (e.g., PMK). This unique key can comprise a random number (RN) (also called a "Nonce"), which may be a hash value based on the first and/or second SSK. At step 340, common trust Node2 110 encrypts the first SSK using the unique key to generate a first encrypted value (EV), and transmits the first EV to Node4 105. Node2 110 also encrypts the second SSK using the unique key to generate a second EV, and transmits the second EV to Node3 107.

At step 350, Node4 105 decrypts the first EV using the second SSK to generate the unique key, and Node3 107 decrypts the second EV using the first SSK to also generate the unique key. In other words, Node4 105 and Node3 107 would each receive different encrypted messages that could only be decoded or decrypted using the secret they share with the common trust Node2 110. The decrypted result (i.e., the unique key) will be the same in each case, and this unique key can be used as the shared secret between Node4 105 and Node3 107. The unique key generally lasts the entire session, and is known to 3 parties, and should be exposed as little as possible.

At step 360, the unique key can be used by Node3 107 and Node4 105 when performing a shared-secret-based mutual authentication protocol, such as a four-way handshake as specified in IEEE 802.1ii, to derive or otherwise establish a temporal key (e.g., a Group Temporal Key (GTK) and a Pair-wise Temporal Key (PTK)) or other secret shared only by Node3 107 and Node4 105. An exemplary four-way handshake process will be described below with reference to FIG. 5.

Roaming

Once Node4 105 and Node2 110 have a shared secret, if Node2 110 and Node3 107 have already established shared secret, then to support subscriber roaming to Node3 107, Node2 110 can act as an introduction node to help Node4 105 and Node3 107 to also establish a shared secret. Node2 110 can then generate and distribute secret keying material to Node3 107 and Node4 105 in the process. This can support fast handoff with which the shared secret between Node4 105 and Node3 107 can be established even before Node4 105 roams or moves to the coverage area of Node3 107.

Figure 4:
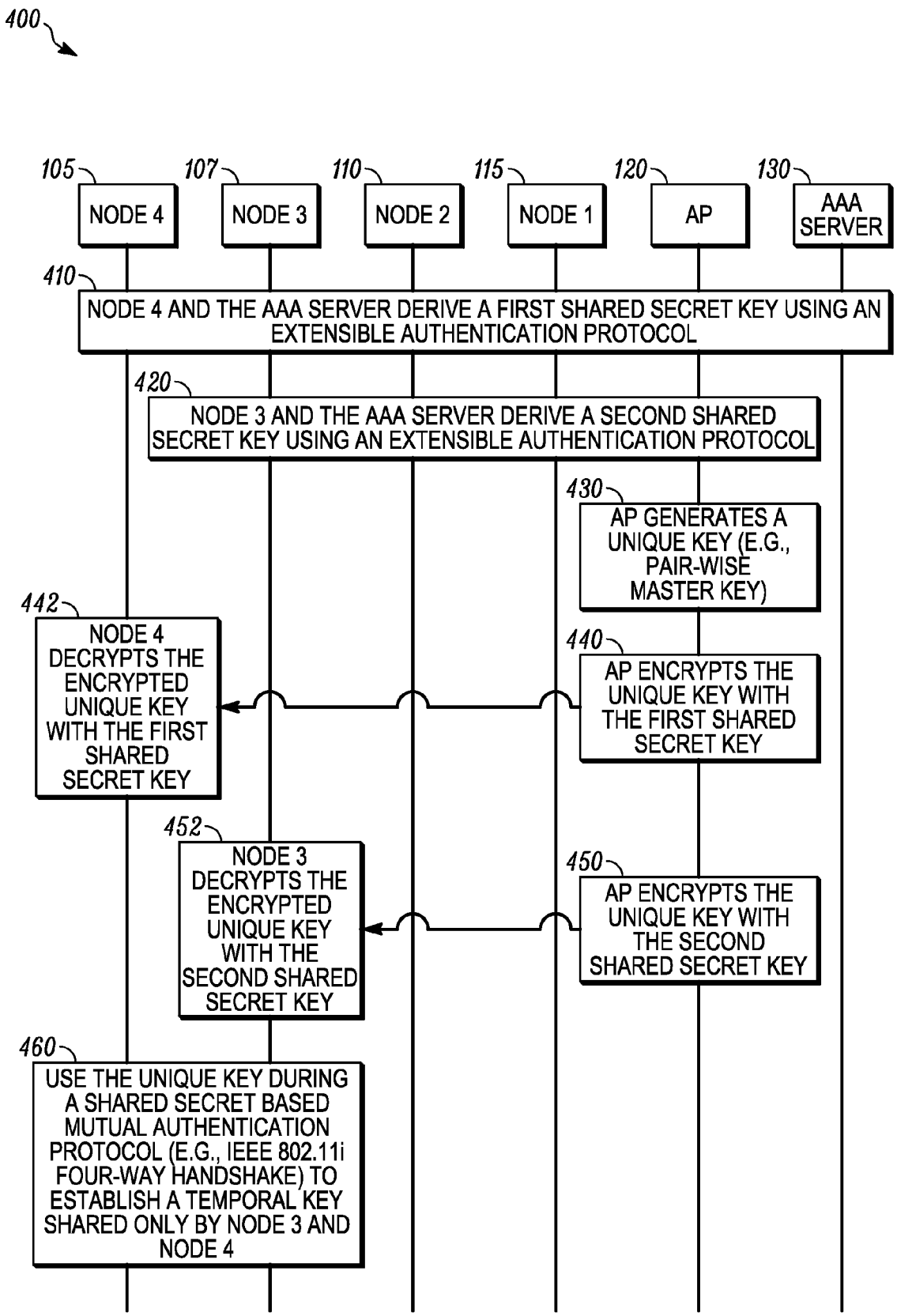
FIG. 4 is a message flow diagram showing processing which occurs at different nodes and messages exchanged by those nodes for establishing a temporal key shared by a Node4 and a Node3 according to one exemplary implementation.

FIG. 4 is a message flow diagram 400 showing processing which occurs at different nodes and messages exchanged by those nodes for establishing a temporal key shared by a Node4 105 and a Node3 107 according to another exemplary implementation. The exemplary ad hoc network shown in FIG. 4 comprises an AP 120, a Node1 115, a Node2 1 10, Node3 107, and Node4 105, and an AAA server 130, where the AAA server 130 is coupled to the AP 120. It will be appreciated by those skilled in the art that the ad hoc network could include more or less nodes than shown in FIG. 4. In this example, the common trust node is AP 120, however, it will be appreciated that the common trust node can be implemented at any node in the ad hoc network and the AAA server 130 can be implemented as an infrastructure component or at any node in the ad hoc network. In addition, it will also be appreciated that for sake of simplicity, other intermediate steps (not shown in FIG. 4) can take place as part of the protocol shown in FIG. 4.

At step 410, the AAA server 130 and Node4 105 derive a first shared secret key via an authentication protocol (e.g., EAP) between the AAA server 130 and Node4 105. The AP 120 and Node4 105 share the first shared secret key.

At step 420, the AAA server 130 and Node3 107 derive a second shared secret key via an authentication protocol between the AAA server 130 and Node3 107. The AP 120 and Node3 107 share the second shared secret key.

At this point, either Node3 107 or Node4 105 attempts to communicate with the other node, and eventually communicates an introduction request message to the AP 120.

At step 430, the AP 120 can generate a unique key. In one embodiment, the unique key comprises a pair-wise master key. In one implementation, the AP 120 may comprise, for example, a pseudo-random number generator configured to randomly generate the unique key. In one implementation, the AP 120 may comprise, for example, a hash function which calculates the unique key by hashing at least one input with the first shared secret key or with the second shared secret key. In yet another implementation, the hash function can calculate the unique key by hashing the first shared secret key and the second shared secret key.

At step 440, the AP 120 encrypts the unique key with first shared secret key to generate a first encrypted unique key and transmits the first encrypted unique key to Node4 105. At step 442, Node4 105 decrypts the first encrypted unique key using the first shared secret key to generate the unique key.

At step 450, the AP 120 encrypts the unique key with the second shared secret key to generate a second encrypted unique key and transmits the second encrypted unique key to Node3 107. At step 452, Node3 107 decrypts the second encrypted unique key using the second shared secret key to generate the unique key. In one implementation, the unique key can be retained on Node4 105 and Node3 107.

At step 460, Node4 105 and Node3 107 can then use the unique key to establish a temporal key, shared only by Node4 105 and Node3 107, for encrypting or protecting data communications between Node4 105 and Node3 107. In one embodiment, where the unique key comprises a pair-wise master key, and Node4 105 and Node3 107 use the pair-wise master key during a shared-secret-based mutual authentication protocol, such as an IEEE 802.11i four-way handshake, between Node4 105 and Node3 107 to derive the temporal key shared only by Node4 105 and Node3 107. Node4 105 and Node3 107 can regularly re-establish the temporal key after a period elapses since the most recent communication between Node4 105 and Node3 107. Techniques for establishing the temporal key will now be described with reference to FIG. 5.

Four-Way Handshake

Figure 5:
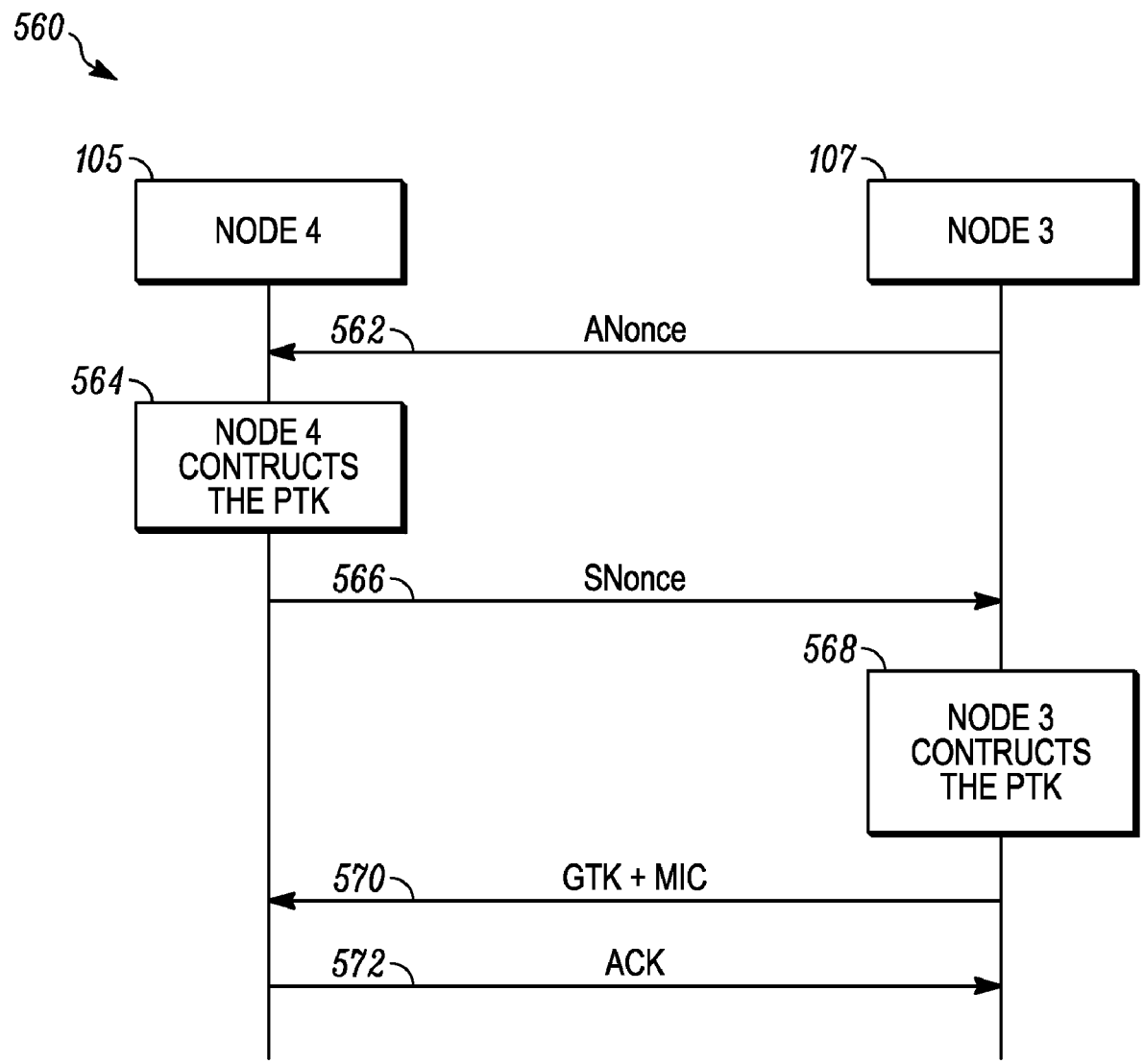
FIG. 5 is a message flow diagram showing messages exchanged during a four-way handshake according to one exemplary implementation.

FIG. 5 is a message flow diagram showing messages exchanged during a four-way handshake 560.

At step 562, Node3 107 sends a first nonce-value (ANonce) to Node4 105. A nonce (or "number used once") is a random number (RN) or pseudo-random number (PRN). At this point, Node4 105 now has all the attributes to construct the PTK. The attributes may comprise: the first nonce-value (ANonce) (which corresponds to the RN), Node4's second nonce-value (SNonce), and possibly MAC addresses of Node3 107 and Node4 105.

At step 564, Node4 105 generates the PTK by concatenating a the attributes (noted above) and running the resulting concatenation through a cryptographic hash (pseudo-random) function. The handshake also yields the GTK which can be used to decrypt multicast and broadcast traffic.

At step 566, Node4 105 sends its own second nonce-value (SNonce) to Node3 107 together with a Message Integrity Code (MIC). The MIC is a cryptographic checksum used in the handshaking process to confirm that the message is not tampered during the transit.

At step 568, Node3 107 uses the second nonce-value (SNonce) to derive the PTK and verifies the MIC from Node4 105.

At step 570, Node3 107 then sends Node4 105 the GTK and a sequence number together with another MIC. The sequence number is the sequence number that will be used in the next multicast or broadcast frame, so that the receiving Node4 105 can perform basic replay detection.

At step 572, Node4 105 sends a confirmation (ACK) to Node3 107 to indicate that set up is complete. Successful communication with the PTK proves that Node4 105 and Node3 107 have mutually authenticated. As soon as the PTK is obtained it can be divided into three separate keys: an EAPOL-Key Confirmation Key (KCK), an EAPOL-Key Encryption Key (KEK), and a Temporal Key (TK). The KCK is used to compute the MIC for EAPOL-Key packets, the KEK is used to provide confidentiality for EAPOL-Key packets, and the TK is used to encrypt the actual wireless traffic.

Mesh Cross Links

Figure 6:
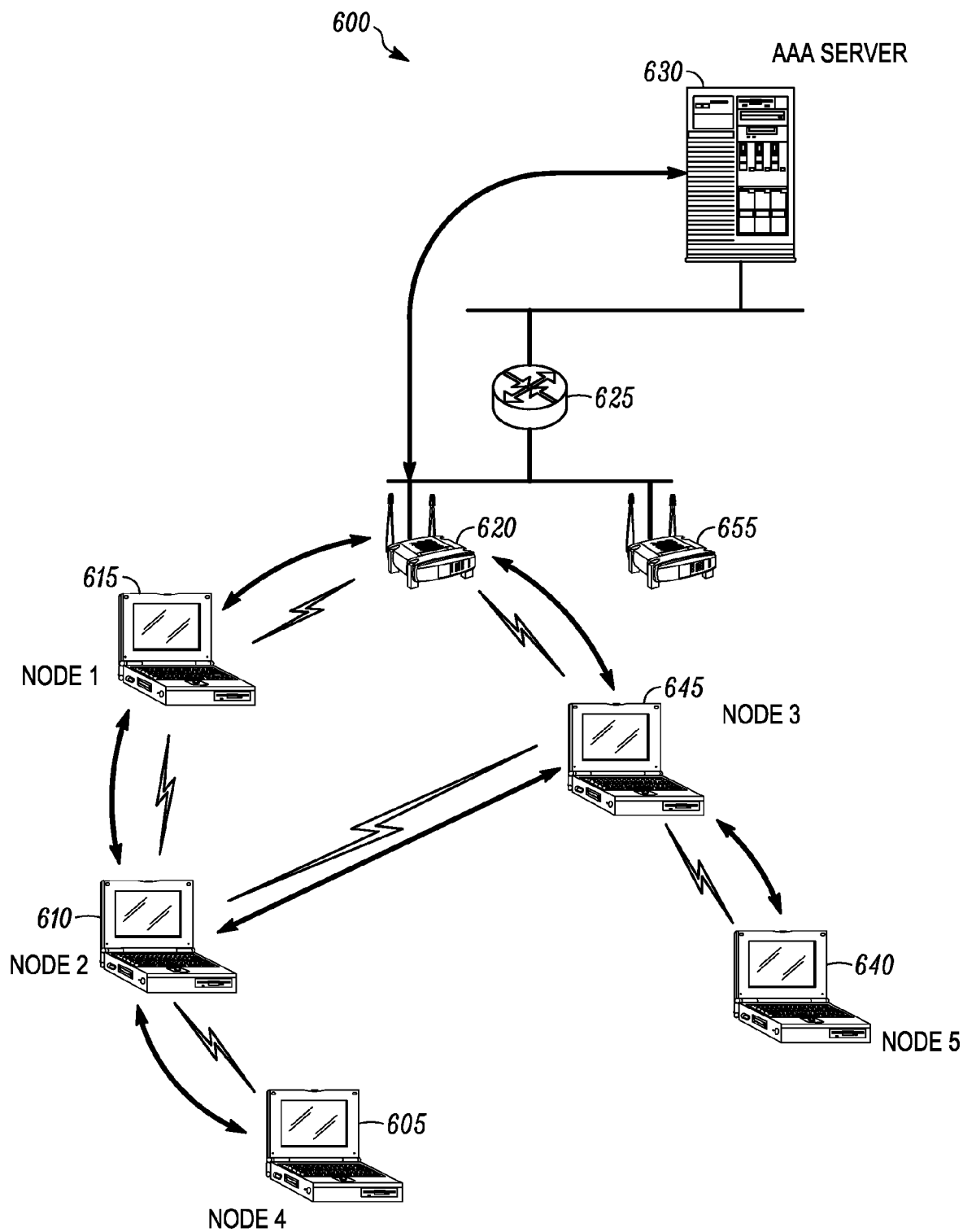
FIG. 6 is a simplified representation of an exemplary ad hoc network illustrating the concept of mesh cross links according to one exemplary implementation.

FIG. 6 is a simplified representation of an exemplary ad hoc network 600. The ad hoc network 600 comprises a Node4 605, a plurality of other nodes 610, 615, 635, 640, 645, access points (IAPs) 620, 655, a router 625, and an AAA server 630. The infrastructure portion of the network includes the IAPs 620, 635 which are coupled to the AAA server 630 via the router 625. In this exemplary network configuration, Node1 615 and Node 645 are one hop from the IAP 620, Node2 610 and Node 640 are two hops from the IAP 620, and node 605 is three hops from the IAP 620.

This exemplary ad hoc network 600 configuration illustrates the concept of mesh cross linking. Even in the absence of subscriber roaming, mesh cross links can be securely established. For example, in FIG. 6, Node2 610 could authenticate through Node3 645 up to the IAP 620 (which shares a secret with Node2 610), or Node3 645 could authenticate through Node2 610 up to the IAP 620 (which shares a secret with Node3 645). In either case, the proposed mechanism would result in a key shared only by the IAP 620, Node2 610 and Node3 645 following which Node2 610 and Node3 645 would go through the usual pair-wise key agreement.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

For instance, the disclosed embodiments can also be extended to the infrastructure-less case where no connection to infrastructure is available. For example, in an autonomous ad hoc network comprising Nodes A, B, C, if Node A can mutually authenticate with Node B, and Node B can mutually authenticate with Node C, but Node A and Node C can not mutually authenticate, then Node B can act as an introduction node, and could securely introduce and distribute keying material to Node A and Node C so that they could securely communicate with each other.

The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A method for establishing shared secret keys between mobile nodes communicating within an ad hoc multihop network, the method comprising:
   joining a mobile node to the ad hoc multihop network by authenticating the mobile node to the authentication server through a neighbor node;
   securely coupling the mobile node to the neighbor node by executing a key agreement protocol at the mobile node and the authentication server to generate a first shared secret key, and then distributing the first shared secret key, from the authentication server to the neighbor node, for use in secure communications between the mobile node and the neighbor node; and
   establishing secure communications between the mobile node and at least one other neighbor node securely coupled to the neighbor node by:
      authenticating the mobile node to the at least one other neighbor node through the neighbor node, and
      securely coupling the mobile node to the at least one other neighbor node by executing a key agreement protocol at the mobile node and the neighbor node to generate a second shared secret key, and then distributing the second shared secret key from the neighbor node to the at least one other neighbor node for use in secure communications.

2. A method as claimed in claim 1, wherein the joining the network step further comprises:
   communicating a request for network connection and authentication from the mobile node to the neighbor node, wherein the neighbor node is an authenticated node within the ad hoc multi hop network; and
   communicating a relay agreement from the neighbor node to the mobile node.

3. A method as claimed in claim 2, wherein the joining the network step further comprises:
   communicating an authentication request from the mobile node to the authentication server through the neighbor node, wherein the authentication request includes a request for establishing a shared secret key with the neighbor node.

4. A method as claimed in claim 3, wherein the securely coupling of the mobile node to the neighbor node step further comprises:
   in response to receiving the authentication request, operating the authentication server to:
      authenticate the mobile node,
      generate the first shared secret key, and
      securely distribute the first shared secret key to the mobile node and the neighbor node in a reply message.

5. A method as claimed in claim 4, wherein the securely coupling of the mobile node to the neighbor node step further comprises:
   in response to receiving the reply message, operating each of the mobile node and the neighbor node to:
      obtain the first shared secret key from the reply message, and
      generate a pairwise temporal key (PTK) from the first shared secret key for use in secure communications between the mobile node and the neighbor node.

6. A method as claimed in claim 5, further comprising:
   using the pairwise temporal key to encrypt data communication between the mobile node and the neighbor node.

7. A method as claimed in claim 1, further comprising after establishing secure communications between the mobile node and the at least one other neighbor node:
   communicating a request for relay authentication, to at least one further neighbor node which is securely coupled to the at least one other neighbor node, from the mobile node to the at least one other neighbor node; and
   communicating a relay agreement from the at least one other neighbor node to the mobile node.

8. A method as claimed in claim 7, further comprising:
   establishing secure communications between the mobile node and at least one further neighbor node securely coupled to the at least one other neighbor node by:
      authenticating the mobile node to the at least one further neighbor node through the at least one other neighbor node, and
      securely coupling the mobile node to the at least one further neighbor node by executing a key agreement protocol at the mobile node and the at least one other neighbor node to generate a third shared secret key, and then distributing the third shared secret key from the at least one other neighbor node to the at least one further neighbor node for use in secure communications.

9. A method as claimed in claim 1, wherein the key agreement protocol comprises an IEEE 802.11i four-way handshake.

10. A method as claimed in claim 1, wherein the neighbor node comprises an access point.

11. A method as claimed in claim 1, wherein the securely coupling of the mobile node to the at least one other neighbor node step further comprises:

operating the neighbor node to:
generate the second shared secret key, and
securely distribute the second shared secret key to the mobile node and the at least one other neighbor node.

12. A method as claimed in claim 11, wherein the securely coupling of the mobile node to the at least one other neighbor node step further comprises:

in response to receiving the second shared secret key, operating each of the mobile node and the at least one other neighbor node to generate a pairwise temporal key (PTK) from the second shared secret key for use in secure communications between the mobile node and the at least one other neighbor node.

13. A method as claimed in claim 12, further comprising:
using the pairwise temporal key to encrypt data communication between the mobile node and the at least one other neighbor node.

* * * * *

UNITED STATES PATENT AND TRADEMARK OFFICE
CERTIFICATE OF CORRECTION

PATENT NO. : 7,793,103 B2  
APPLICATION NO. : 11/464744  
DATED : September 7, 2010  
INVENTOR(S) : Fu et al.

Page 1 of 1

It is certified that error appears in the above-identified patent and that said Letters Patent is hereby corrected as shown below:

On Title Page 2, Item (56), under "OTHER PUBLICATIONS", Line 2, delete "ares" and insert -- area --, therefor.

On Title Page 2, Item (56), under "OTHER PUBLICATIONS", Line 4, delete "802.11;" and insert -- 802.11i; --, therefor.

In Fig. 5, Sheet 5 of 6, for Tag "564", in Line 2, delete "CONTRUCTS" and insert -- CONSTRUCTS --, therefor.

In Fig. 5, Sheet 5 of 6, for Tag "568", in Line 2, delete "CONTRUCTS" and insert -- CONSTRUCTS --, therefor.

In Column 8, Line 65, delete "802.1ii," and insert -- 802.11i, --, therefor.

In Column 10, Line 29, delete "a the" and insert -- the --, therefor.

Signed and Sealed this  
Twenty-fifth Day of December, 2012

David J. Kappos  
*Director of the United States Patent and Trademark Office*